May 15, 1951     H. W. PROTZELLER     2,553,471
MEANS FOR THE TRANSPORTATION, REFRIGERATION,
AND DISTRIBUTION OF PERISHABLE FOODS

Filed June 23, 1944                      9 Sheets-Sheet 1

May 15, 1951  H. W. PROTZELLER  2,553,471
MEANS FOR THE TRANSPORTATION, REFRIGERATION,
AND DISTRIBUTION OF PERISHABLE FOODS
Filed June 23, 1944  9 Sheets-Sheet 7

Inventor
Harry W. Protzeller
by Arthur W. Nelson Atty.

Patented May 15, 1951

2,553,471

UNITED STATES PATENT OFFICE 2,553,471

MEANS FOR THE TRANSPORTATION, REFRIGERATION, AND DISTRIBUTION OF PERISHABLE FOODS

Harry W. Protzeller, Fairmont, Minn., assignor of one-half to Arthur Wm. Nelson, Chicago, Ill., and S. F. Judd, executor of said Harry W. Protzeller, deceased, assignor of one-half to Arthur Wm. Nelson, Chicago, Ill.

Application June 23, 1944, Serial No. 541,810

5 Claims. (Cl. 62—102)

The invention relates generally to means for the transportation, refrigeration and distribution of perishable foods, either in the fresh or frozen form.

One of the objects of the invention is to provide means whereby much of the waste heretofore prevalent in the distribution of food may be eliminated.

Another object of the invention is to provide food container means of a form that is interchangeable to or from, any type of carrier service, such as highway trucks, railway cars, or aircraft.

Again, it is an object of the invention to provide container means whereby the food product may be distributed with maximum economy and efficiency and with a minimum of handling and waste of the product.

A further object of the invention is to provide means adapted to the marketing of fresh or frozen foods direct from producer to consumer with means functioning to maintain the desired low temperature necessary for best preservation of the foods while the container means is in transit or in non-refrigerated storage space.

Still further objects of the invention are to provide means which will cushion the food containers against shocks and jars; which will facilitate loading in and unloading of the products from the container compartment; means whereby products may be shipped without the use of crates or packing cases; means whereby a plurality of containers may be mounted in superposed relation on a railroad flat car or the platform of a road truck or trailer; means enabling a single operator to handle conveniently a loaded container; mechanical refrigerating means readily applicable to and removable as a unit from the container proper.

Further objects of the invention, together with the many advantages thereof, will appear as I proceed with the description of the invention in connection with the accompanying drawings.

Certain parts of the apparatus hereinafter described, are primarily intended to be carried by vehicles generally used in highway, railway and airway service for the transportation of food products and such vehicles have certain limitations as to weight and volumetric dimensions imposed upon them by law. Also sizes for packaged food have been standardized. The apparatus of this application has dimensional characteristics that not only brings the same within such limitations, but permits a universal interchange of the apparatus from one type of transport vehicle to another. Furthermore, certain parts of the apparatus have been proportioned for a more efficient stowage of the packaged food and whereby such food arrives at its destination in first class condition. Therefore, for a better understanding of the apparatus and its use in connection with the above mentioned vehicles, as well as with boats, certain dimensional characteristics of the apparatus will be mentioned and shown on the drawings to make the adaptability of the apparatus more apparent.

In general the apparatus includes an open top insulated container body, divided into a number of transverse compartments by what are hereinafter termed "cold plate" partitions, each of which compartments is provided with a removable cover. The container body is so made as to have a refrigerating unit detachably engaged therewith and to include vibration absorbers and by which each container body may be releasably locked either singly or in multiples not only to the carrying vehicle, but to each other.

*The container*

Figure 1:
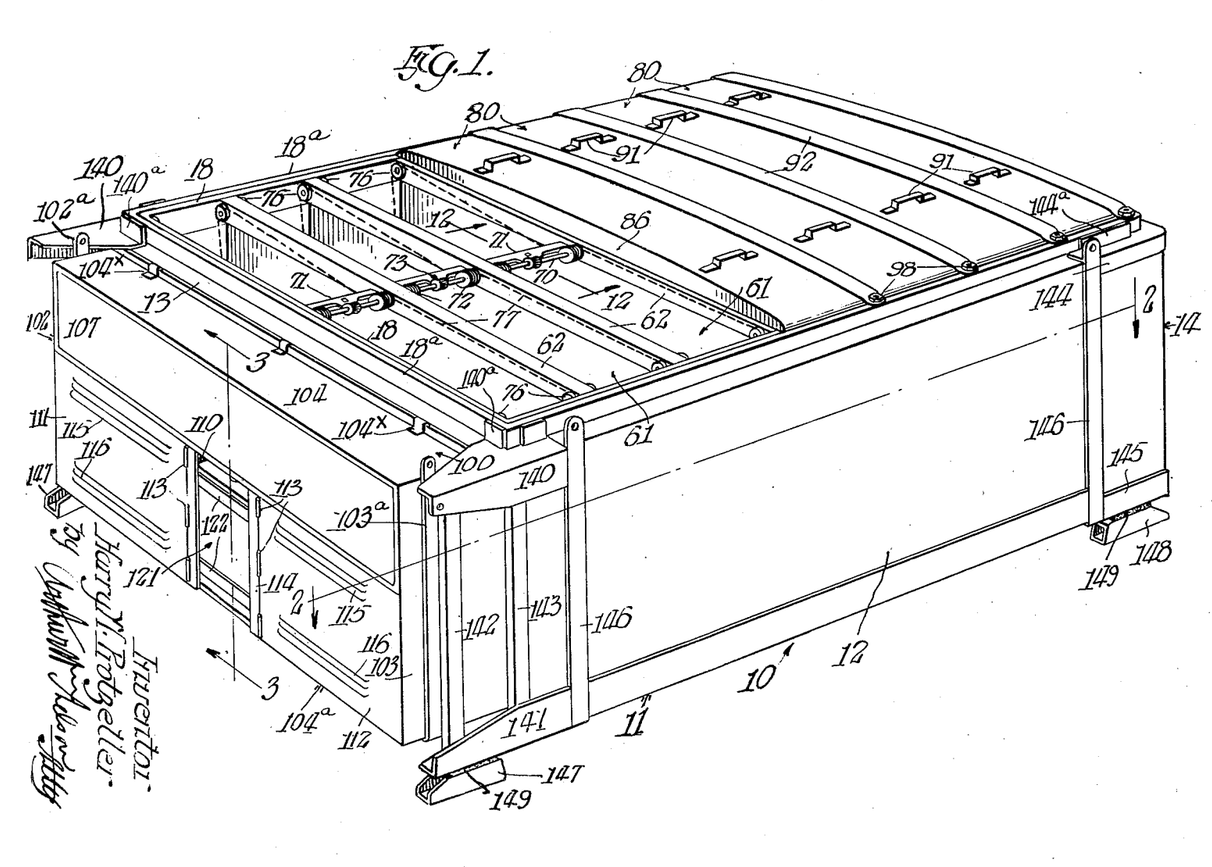
Fig. 1 is a perspective view of a transport service container body and an associated detachable refrigerating unit embodying the preferred form of the invention, with certain of the covers associated with the open top end of the food product compartments in the body of the container, being shown as removed for a better illustration of the parts in the container body.

The container includes an open top rectangular body 10 which, as best shown in Fig. 1, is longer than it is wide, and wider than it is deep from top to bottom. A container body 111 inches long by approximately 96 inches wide and about 48 inches high is recommended. The body includes a bottom 11, sides 12—12 and ends 13 and 14 respectively, all of a hollow, double wall, insulated construction.

Figure 3:
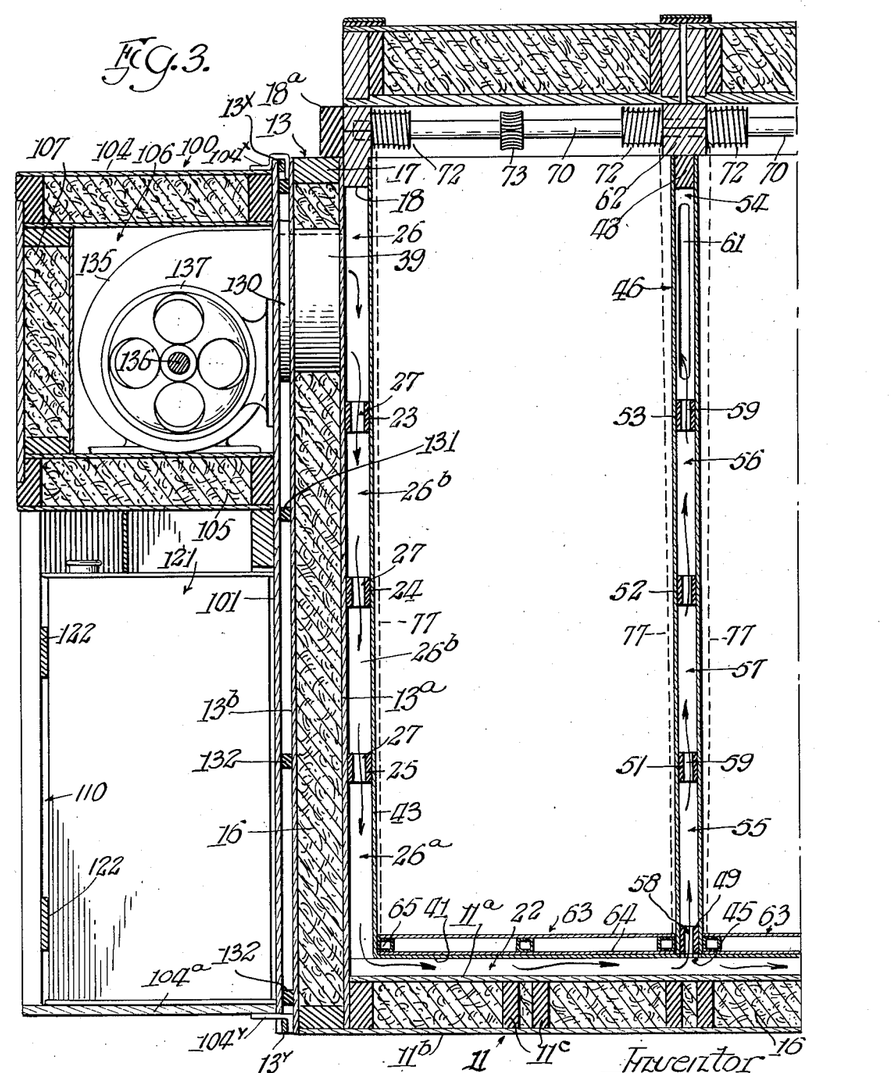
Fig. 3 is a vertical sectional view through one end of the container and associated refrigerating unit, as taken on the line 3—3 and on a scale enlarged over that of Fig. 1.

The bottom 11 includes upper and lower walls 11a—11b held in spaced relation by pairs of transverse wooden strips 11c—11c, see Fig. 3, said walls preferably being of plywood.

Figure 2:
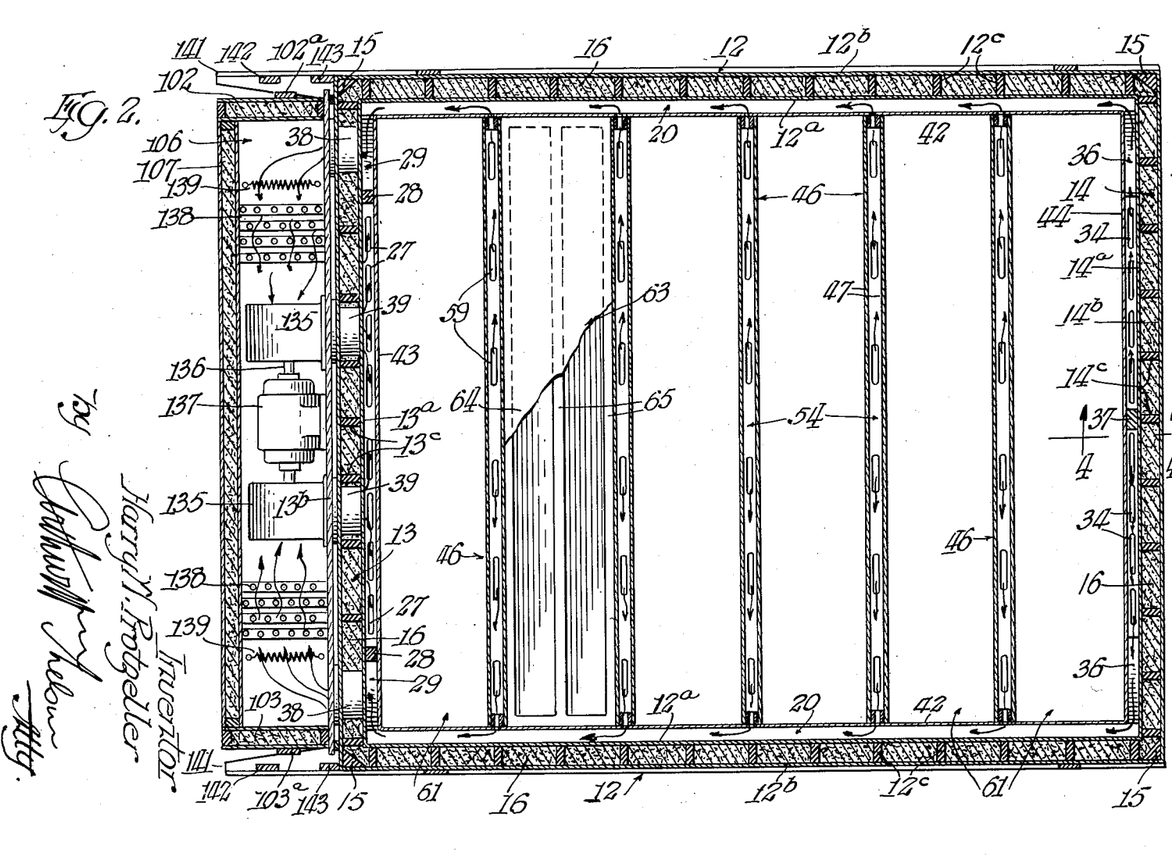
Fig. 2 is a horizontal sectional view through the container body and refrigerating unit shown in Fig. 1, as taken on the line 2—2 of said Fig. 1.

Each side 12 includes inner and outer walls 12a—12b held in spaced relation by longitudinally spaced upright wooden strips 12c, see Fig. 2, said walls also being preferably made of plywood.

The ends 13 and 14 each include inner and outer walls 13a—13b and 14a—14b respectively held in spaced relation by longitudinally spaced upright wooden strips 13c and 14c respectively, see Fig. 2. At the junction corners of the side and ends of the body are corner posts 15 (see Fig. 2) and suitable insulation such as fibre glass 16 is disposed in the spaces between the walls of the bottom, sides and ends of the body. The space between the upper parts of the walls of said sides and ends is closed by a strip 17 and extending about the inside of the top of the body is an upright coaming comprising inner and outer coaming strips 18 and 18a respectively. The inner coaming strip 18 is disposed partly inside the body 10 of the container and the outer coaming strip 18a overlaps a part of the strip 17, as best appears in Figs. 3 and 4 respectively. This arrangement of said strips 18 and 18a provides a strong, durable and relatively thick coaming that extends around the entire open top end of the body.

Figure 6:
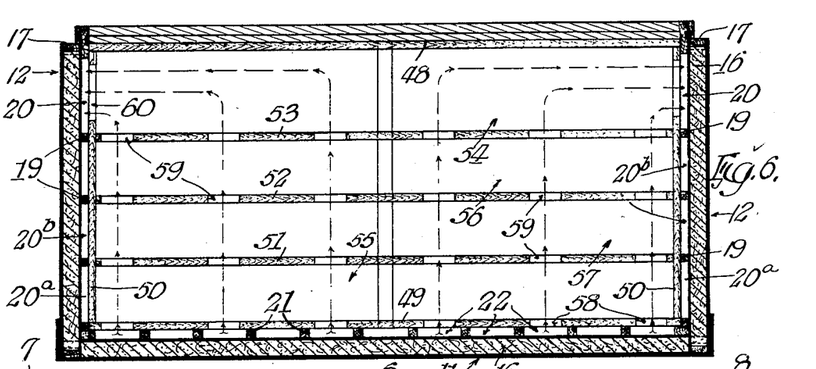
Fig. 6 is a transverse vertical sectional view through the body of the container as taken on the line 6—6 of Fig. 5.

On the inner faces of the inner walls of both sides 12—12 are secured vertically spaced, longitudinal strips of wood 19 which provide upper, lower and intermediate channels 20—20a and 20b respectively therebetween, as appears in Fig. 6. On the upper surface of the upper wall 11a of the bottom are laterally separated longitudinal strips 21—21 which provide channels 22—22 between them. This arrangement of strips best appears in Fig. 6.

Figure 7:
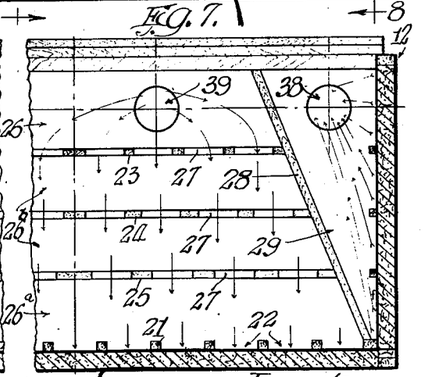
Figs. 7 and 8 respectively are fragmentary transverse vertical sectional views through end portions of the container body as taken on the lines 7—7 and 8—8 respectively of Fig. 5.

On the inner face of the wall 13a (see Fig. 3) of the end 13 are provided vertically separated strips 23—24 and 25 respectively, which provide upper, lower and intermediate channels 26—26a and 26b respectively therebetween. In said strips are longitudinally spaced openings 27 whereby communication is afforded between said channels, as best appears in Fig. 3. Upwardly and inwardly inclined strips 28 close off the ends of the channels 26—26a and 26b and define channels 29 (only one of which appears in Fig. 7) that communicate with the channels 20—20a and 20b at the sides of the body 10, as obvious from said Fig. 7.

Figure 8:
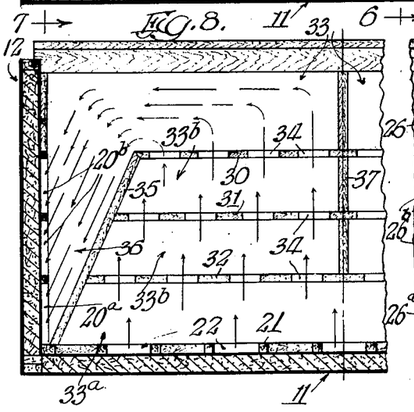

On the inner face of the wall 14a of the end 14 are provided vertically separated strips 30—31 and 32 respectively, which provide upper, lower and intermediate channels 33—33a and 33b respectively therebetween. In said strips are longitudinally spaced openings 34 whereby communication is afforded between said channels as best appears in Figs. 4 and 8. Upwardly and inwardly inclined strips 35 close off the end of the bottom and intermediate channels 33a and 33b and define a channel 36 (see Fig. 8) by which the upper channel 33 communicates with the channels 20—20a and 20b of the sides 12—12. An upright partition strip 37 separates the upper channel 33 and the intermediate channels 33b at their middle as best shown in said Fig. 8.

Extending through the end 13 of the body are pairs of openings 38 and 39 respectively formed by metallic sleeves. The openings 38—38 communicate at one end with the upper portions of the channels 29—29 while the openings 39—39 communicate with the upper channel 26 only as obvious from Fig. 7. The purpose of said openings 38—39 will appear later.

*Cold plate compartment*

Figure 9:
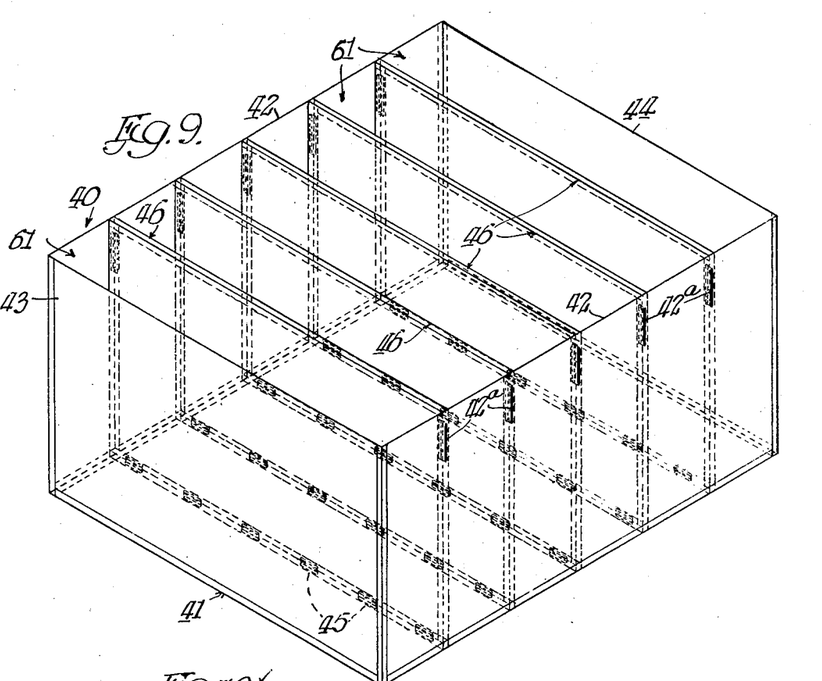
Fig. 9 is an isometric perspective view of a means disposed within the container body for dividing the same into cold plate, separated compartments.
Figure 10:
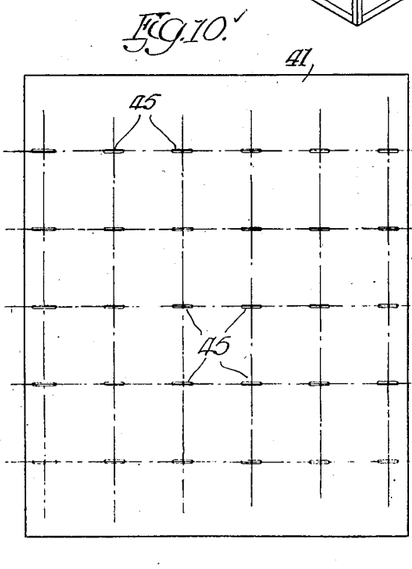
Fig. 10 is a view in elevation of the bottom cold plate of the means of Fig. 9 and shows the arrangement of the cold air orifices therein and which will be later mentioned.

In Fig. 9 is illustrated a cold plate assembly 40, which is so proportioned with respect to the container body as to fit snugly within the same. This assembly includes an open top casing having a bottom 41, sides 42—42 and ends 43—44 respectively, all made of thin sheet metal. When the open top casing of said assembly is disposed within the container 10, its bottom 41 rests on the strips 21 on the bottom 11 of the container, its sides 42—42 engage against the strips 19 on the sides 12—12 of the body and its one end 43 engages the strips 23—24 and 25 of the container end 13 while its other end 44 engages the strips 30—31 and 32 of the container end 14. Thus the bottom, sides and ends of the casing close the open sides of the channels between the strips mentioned.

Figure 11:
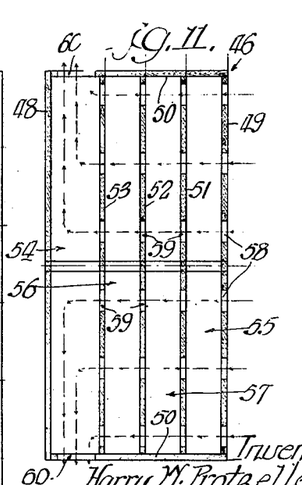
Fig. 11 is a longitudinal vertical sectional view through one of the cold plates shown in Fig. 9 and which will be more fully referred to later.
Figure 11A:
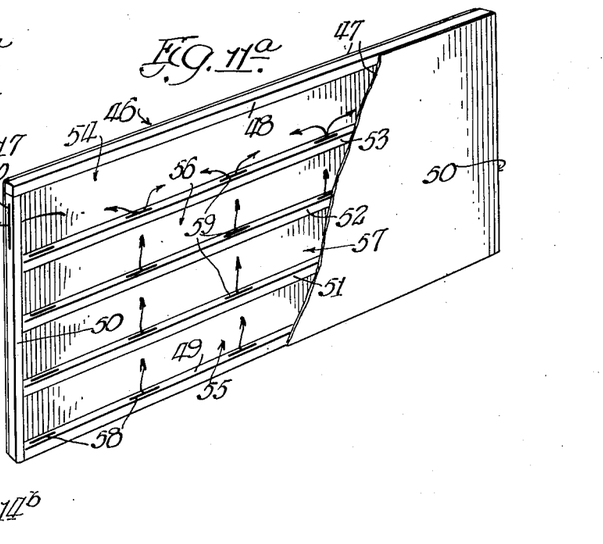
Fig. 11a is a perspective view of the cold plate of Fig. 11, on a somewhat enlarged scale and with parts broken away better to show the interior construction thereof.
Figures 12, 14:
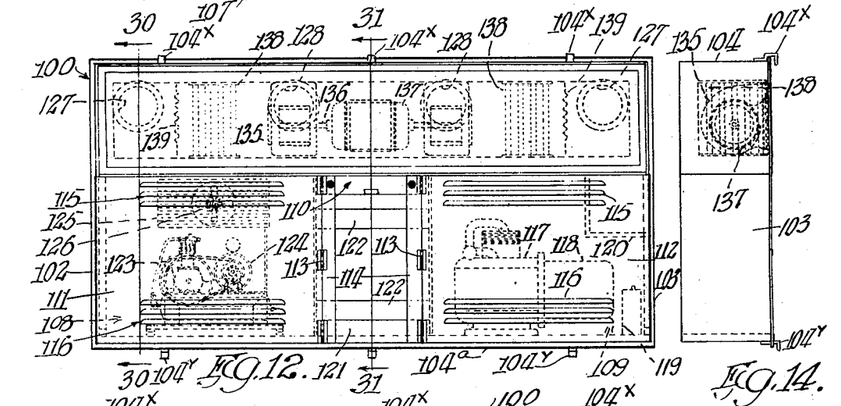
Fig. 12 is a view in front elevation of a preferred form of refrigerating unit adapted for detachable engagement with the container body before mentioned.
Fig. 14 is a view in elevation of the right hand end of the unit appearing in Fig. 12.
Figure 13:
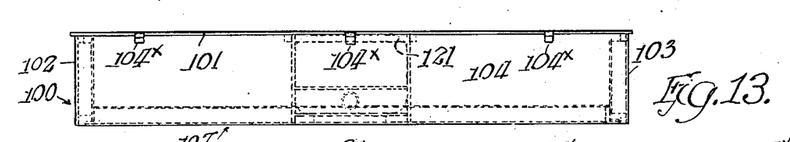
Fig. 13 is a top plan view of the unit appearing in Fig. 12.

In the bottom 41 of the casing of the assembly there is provided on transverse lines, laterally spaced elongated openings 45 which communicate with the channels 22 on the bottom 11 of the container body 10. Extending transversely of the assembly casing, in the plane of each line of openings 45—45 is a rectangular cold plate 46, which best appears in perspective in Fig. 11a. Each cold plate, which is of the height and width of the casing 40, includes thin sheet metal sides 47—47 fastened to top and bottom strips 48—49 and to end strips 50—50, said strips being preferably made of wood. Vertically spaced strips 51—52 and 53 (also made of wood) are arranged in the body of the plate and extend between the end strips 50—50. These strips coact to divide the cold plate 46 into top and bottom channels or spaces 54—55 respectively and intermediate channels or spaces 56 and 57 respectively. The bottom strips 49 have slot-like openings 58 therein that register with the openings 45 in the bottom 41 of the casing 40. The strips 51—52 and 53 also have slit-like openings 59 therein in line with the openings 58 whereby communication is afforded between the various channels mentioned. In the upper portion of each end strip 50 is a slot-like opening 60 which communicates with the upper channel 54. When the assembly is disposed in the container body, the slot-like openings 60—60 register with complemental openings 42a (see Fig. 9) in the sides 42 of the casing 40 so as to communicate with the upper channels 20—20 in the sides 12 of the body as provided by the strips 19—19. The path of circulation for cold air, which passes through each cold plate under pressure, as will be later mentioned, is indicated by arrows in Figs. 11 and 11a respectively.

The cold plates 46—46 divide the assembly casing into a plurality of laterally extending food product receiving and holding compartments 61—61 (see Fig. 1). When the assembly 40 is in place in the container body 10, a horizontally split, transverse wooden bar 62 is disposed to engage the top edge of each cold plate, and each bar abuts and is fixed at its ends to those parts of the coaming strips 18 associated with the sides 12 of the container body 10.

Figure 4:
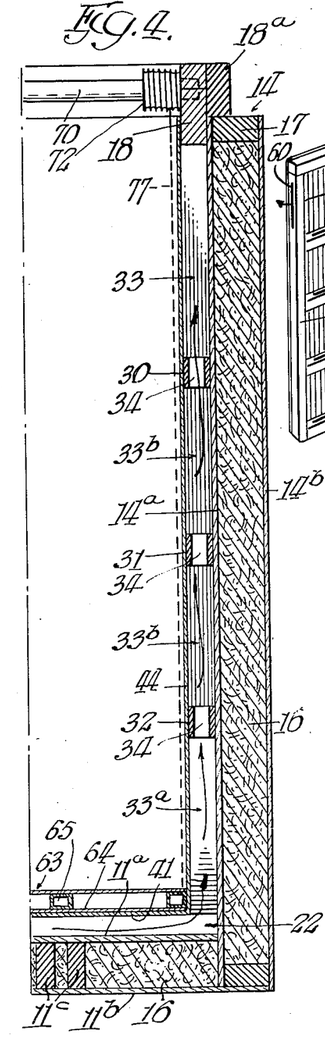
Fig. 4 is a vertical, sectional view through the other end of the container body on the scale of Fig. 3, as taken on the line 4—4 of Fig. 2.
Figure 5:
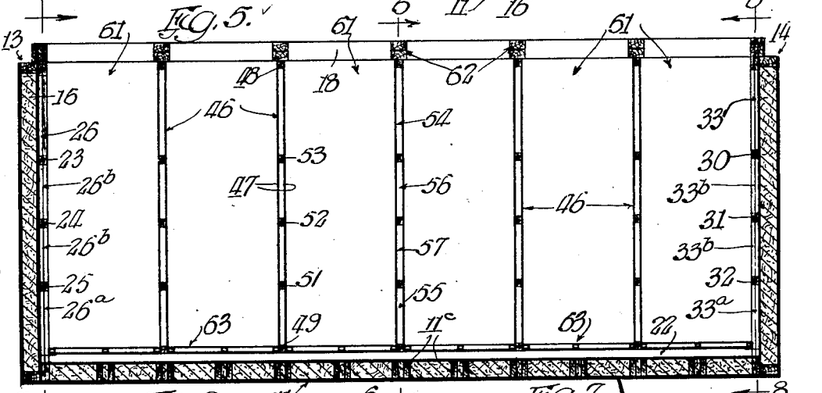
Fig. 5 is a longitudinal vertical sectional view through only the body of the container and the cold plates contained therein, on a scale reduced from that of Fig. 3, and shows the manner in which said plates divide said body into food product compartments.

Associated with and fitting fairly snugly in each compartment 61 is an elongated, rectangular, hollow product-supporting bottom or plate 63 best appearing in Figs. 3 and 4. Each plate includes top and bottom thin metallic sheets 64—64 fixed to a frame 65 of metallic tubing of rectangular cross section. This supporting plate is intended for a vertical movement in the associated compartment.

*Compartment cover construction*

Each compartment 61 of the casing 40, when the latter is disposed in the container 10, is provided with a cover 80 of a construction insulated against heat loss. On the upper surface of the cover, toward its opposite ends are provided U-shaped handles 91, by which the covers may be removed from or applied in place.

When the covers are all in place to close the top end of the associated compartments 61, the side extensions 86 of adjacent covers overhang the same bar 62. To seal the joint or seam between adjacent covers and to secure the covers against accidental displacement, the following arrangement is provided. 92 indicates a flexible metal strip of a width sufficient to span the seam or joint between the lateral extensions 86 of two adjacent covers 80. By means of nuts 98 on the end of associated bolts, the flexible strips 92 may be drawn tightly in place.

*Refrigerating apparatus*

In Figs. 12, 13, 14, 15, 16 and 17 is illustrated a refrigerating unit 100, which may be detachably engaged upon the end 13 of an associated container body 10 as will soon appear.

The refrigerating apparatus is disposed in a casing having a back wall or board 101 of substantially the area, shape and size of the end 13 of the container body 10, with which it is associated. The casing includes left and right hand side walls 102—103, a top wall 104, a bottom wall 104a and a horizontal partition 105; certain ones of which are of a double wall structure to provide suitable insulation. The top wall 104, parts of the side walls 102—103 in connection with the partition 105, define an open front chamber 106 in the upper portion of the casing. A door 107 may be detachably applied to said walls and partition to close the open front of the chamber 106.

That part of the casing below the partition 105 is divided into side compartments 108 and 109 respectively separated by a central compartment 110. Each compartment 108—109 is provided with a door 111—112 respectively hinged at their inner ends as at 113 to upright bars 114, one at each side of the central compartment 110. Each door 111 and 112 is provided with upper and lower sets of louvered openings 115 and 116 respectively.

In the compartment 109 is located a gasoline engine 117 that direct drives a generator 118. Also, in this compartment is located a storage battery 119 and a casing 120 for housing certain control apparatus not shown.

In the central compartment 110 is located a fuel tank 121 for the engine 117, the tank being removably held in place by cross strips 122.

In the bottom of the compartment 108 is located the compressor 123 and associated liquid receiver of the refrigerating apparatus, and an electric motor 124 for driving the compressor. In the upper portion of the compartment 108 is located the air cooled condenser 125 of the apparatus and with this condenser there is associated a motor driven fan 126 for cooling the same by blowing air therethrough and out through the associated louvered openings 115.

In the upper part of the back board 101, so as to communicate with the compartment 106, is a pair of openings 127 for the inlet of air into said compartment and a pair of openings 128 for the outlet of air from said compartment, the openings 127 being disposed toward the end portions of the compartment 106 and the openings 128 being disposed toward the mid portion of said compartment.

Figure 15:
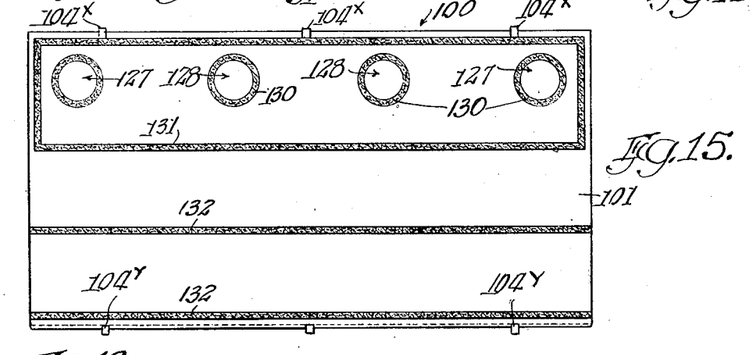
Fig. 15 is a view in rear elevation of the unit appearing in Fig. 12 and more particularly illustrates an arrangement of rubber or like strips thereon for a tight sealing engagement of the unit with the associated end or wall of the container body when operatively positioned thereon.
Figures 16, 17:
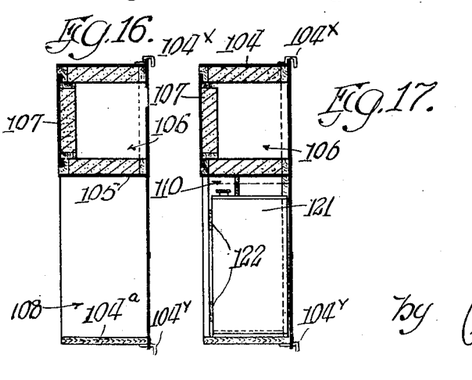
Figs. 16 and 17 are transverse vertical sectional views through the refrigerating unit of Fig. 12 as taken on the lines 30—30 and 31—31 respectively on said Fig. 12.

The openings 127—127 are adapted to register with the sleeves 38 before mentioned in the end 13 of the container body 10 (see Fig. 2). The openings 128 have the outlet of certain blowers, hereinafter mentioned, connected thereto and are arranged to register with the sleeves 39, before mentioned, in said end of said container body. On the outer face of the back board 101 and surrounding the end of each opening 127 and 128 is a circular rubber ring 130. Also, on said face of the board and embracing the area of the seal rings is a rectangular seal 131. Other sealing strips 132—132 are applied to said face of the board as best shown in Fig. 15.

In the compartment 106 is a pair of blowers 135—135, each having its outlet end operatively connected to an associated outlet opening 128. The impellers (not shown) of both blowers are fixed to the armature shaft 136 of an electric motor 137 disposed between said blowers and mounted on the back board 101.

Also located in the compartment 106 between the blowers 135 and openings 127 is a cooling unit 138 which is operatively connected to the condenser 125. Also in said compartment 106 between each cooling unit 138 and adjacent inlet opening 127 is located an electrical heating element 139 for defrosting the adjacent cooling unit 138 when necessary.

As before mentioned, the refrigerating unit 100 is adapted for detachable engagement upon the end 13 of a container body and when so engaged the openings 127 in the back board 101 register with the sleeves 38—38 and the openings 128 in said board, with which the outlets of the blowers 135 are associated, register with the sleeves 39, the rings 130 affording a leak-proof medium between said openings and sleeves.

To afford the detachable engagement between the unit 100 and the end 13 of the body 10, there is provided along the top and bottom margins of the wall 13b of the body end 13, staple-like elements 13x—13y. Fixed to the top and bottom walls 104 and 104a respectively of the unit 100, so as to project beyond the back board 101 thereof and to register with and engage the staple-like elements 13x and 13y just above mentioned, are hooks 104x and 104y respectively, as best appears in Figs. 3, 12, 13 and 14.

The unit 100 is of a weight which cannot be manually lifted with ease and therefore there is provided at each side 102—103 thereof, lift straps 102a and 103a respectively, which best appear in Fig. 1. These straps extend above the top 104 of the unit and are there apertured to receive the hooks of a power lifting device such as a crane. These straps are so disposed on the unit that when said unit is lifted by said straps, it remains perpendicular. When the crane has lifted the unit, its back board 101 is disposed so that its hooks 104x and 104y will align with and be slightly above the staple-like elements 13x—13y. The unit is then lowered so that said hooks 104x and 104y enter said elements 13x and 13y to operatively engage the unit 100 with the casing body 10. The rubber seals 130—131 and 132 then afford a good noise-proof sealed engagement of the unit 100 with the body 10.

*Operation of parts thus far described*

When the refrigerating unit 100 is in place upon a container body 10 and such body is disposed near a source of current, suitable to drive the motors 124 and 137, said motors are connected to said source of current so as to operate the apparatus thereof. When the container body and refrigerating unit is in transport upon a vehicle such as an automobile truck or railroad car, or elsewhere, wherein such source of current is not available, the gasoline engine 117 is caused to drive the generator 118 to provide that current necessary to run the motors 124 and 137.

When said motors are in operation, refrigeration is produced at the cooling units 138 and the blowers 135 are being driven to recirculate air through the container body 10 and cold plates 46 therein. Air entering the inlet sides of the blowers 135 must first pass through the cooling units 138 to be reduced to the proper low temperature. Such cold air as is discharged by the blowers passes through the sleeves 39 into the uppermost channel 26 between the inner wall 13a of the body end 13 and associated end wall 43 of the casing 40. Such cold air then passes down through the openings 27 in the strips 23, 24 and 25 into the channels 22 as formed by the strips 21 on the bottom 11 of container body. From the channels 22, the air passes through the openings 45 in the bottom of the casing 40 to enter the cold plates 46 through the openings 58 therein. This cold air passes upwardly through the openings 59 in the strips 51, 52 and 53 and compartments 55, 57, 56 and 54 in said cold plates and into and out of the top compartments 54 thereof by means of the openings 60 therein. As said openings 60 of all of the cold plates communicate with the channels 20 along the inner faces of both the sides of the container body, the air follows said channel back to the compartment 29 associated with the end 13 of the container body and out through the sleeves 38 back into the compartment 106 of the refrigerating unit for a repassage through the units 138 and a recirculation as provided by the blowers 135.

A part of the air driven along the channels 22 on the bottom of the container body passes up into the chambers 33a, 33b and 33 as provided by the strips 32, 31 and 30 on the wall 14a of the end 14 of the body, in association with the end wall 44 of the casing 40 to pass up through the openings in said strips to enter the top compartment 33. This top compartment, which is divided centrally by the vertical strip 37 also communicates with the channels 20 before mentioned.

With the construction described, by reason of the path through which the recirculated cold air must pass, each product compartment 61 of the container is cooled along the bottom, both sides, and both ends.

It is pointed out at this time that when a container and associated refrigerating unit is in storage or wherever suitable electric power is available from a regular commercial source, the refrigerating apparatus operates by plugging an ordinary extension cord into a socket on the unit provided for that purpose. When this is done, the gasoline engine 117 is automatically stopped and the generator 118 is disconnected from the motor 124.

Each container is provided with a thermostat (not shown) near the top of each compartment where it is in the highest temperature location of the product in the compartment. This thermostat is easily regulatable for any desired temperature range from 40° above zero to 10° below zero F. The thermostat operates to start or stop the compressor motor 124 and blower motor 137. If the product temperature rises two degrees above the desired amount, the refrigerating apparatus begins operation and continues until the temperature reaches two degrees below the desired amount and then it stops. Thus, an average constant product temperature is maintained.

*Standard product cartons of the frozen food industry*

The present general practice of the frozen food industry is to prepare such products for shipment in three standard sizes of cartons, i. e. 12 oz. size, 2½ lb. size and 5 lb. size.

Figure 18:
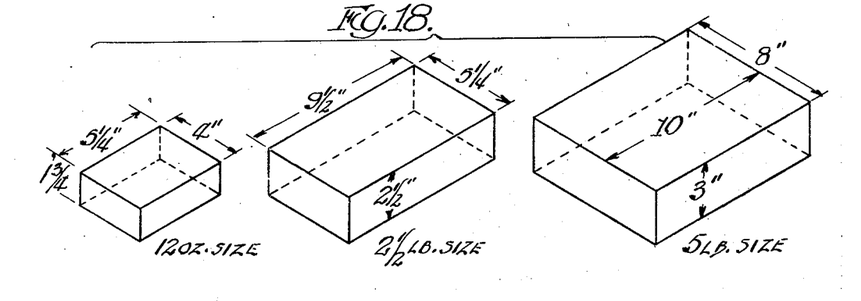
Fig. 18 is a diagrammatic group perspective view of the standard product cartons used in the frozen food industry.

In Fig. 18, I have shown a plurality of schematic isometric views of such cartons and have applied thereto the dimensions thereof. For instance a 12 oz. size carton is about 5¼" long, 4" wide and 1¾" high. A 2½ lb. size carton is 9½" long, 5¼" wide and 2½" high, while a 5 lb. size carton is 10" long by 8" wide and 3" high.

The cartons are usually packed into cases as follows: twenty-four 12 oz. cartons in a case, twelve 2½ lb. cartons in a case and six 5 lb. cartons in a case. When so packed the twenty-four 12 oz. cartons contain 18 lbs. of product and 2.85 lbs. of containers, or about 15.8% of the net product weight. The twelve 2½ lb. cartons contain 30 lbs. of product and 3.25 lbs. of containers or 10.8% of product weight. The six 5 lb. cartons contain 30 lbs. of product and 3.40 lbs. of containers or 11.1% of product weight.

Figure 22:
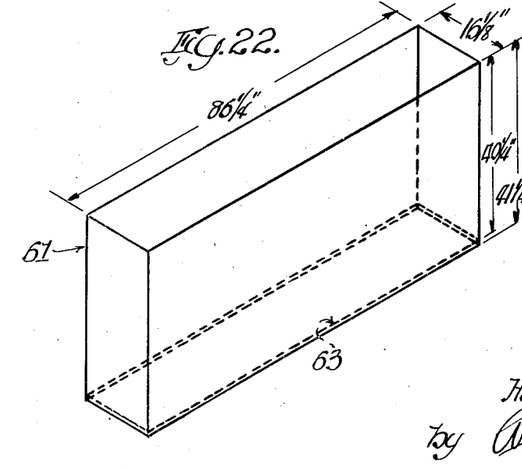
Fig. 22 is a diagrammatic perspective view more particularly illustrating the interior dimensions of one of the product compartments in the container body.

Each product compartment 61 of the container body has been proportioned for the best packing or stacking of all three sizes of such containers and in Fig. 22 I have illustrated schematically with dimensions one of such compartments. As shown, said compartment is 86¼" long, 41¼" high outside and 16⅛" wide and has a bulk capacity of 55,300 cubic inches or 32 cubic feet. The bottom or lifting plate 63 is about an inch thick so that the effective product package height is 40¼" inside.

Figure 19:
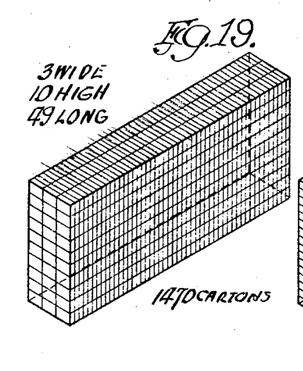
Fig. 19 is a diagrammatic perspective view showing a stacking arrangement of smallest size of standard cartons shown in Fig. 18, in one of the product compartments of the container body.
Figure 20:
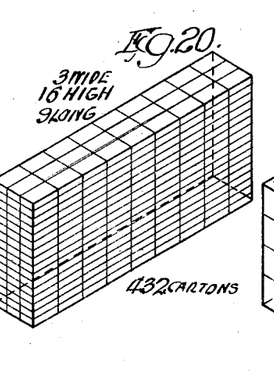
Fig. 20 is another diagrammatic perspective view showing a stacking arrangement of intermediate size of standard carton shown in Fig. 18, in one of the product compartments of the container body.
Figure 21:
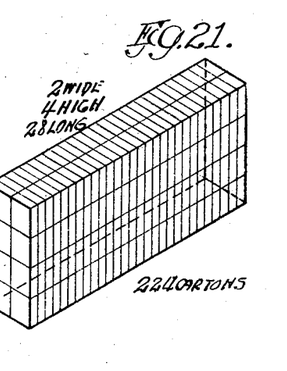
Fig. 21 is still another diagrammatic perspective view showing a stacking arrangement of largest size of standard carton shown in Fig. 18, in one of the product compartments of the container body.

In Figs. 19, 20 and 21 I have illustrated schematically the way of stacking groups of the three different sizes of product cartons mentioned. For instance, in Fig. 19 is shown an arrangement of a stack of the 12 oz. cartons, forty-nine cartons long by ten cartons high by three cartons wide. In such a stack there are 1470 cartons with a gross weight of 1205 lbs. and a net product weight of 1103 lbs. In Fig. 20 is shown an arrangement of a stack of 2½ lb. cartons nine long by sixteen high by three wide. In such a stack there are 432 cartons with a gross weight of 1149 lbs. and a net product weight of 1080 lbs. In Fig. 21 is shown an arrangement of a stack of 5 lb. cartons, twenty-eight long by four high and two wide. In such a stack there are 224 cartons with a gross weight of 1218 lbs. and a net product weight of 1120 lbs.

Such stacks of packages will fit nicely in a compartment 61 and this in a manner so that there will be little or no shifting of the individual cartons in a stack. Therefore, it is obvious that the product compartment meets present standard practices with material saving in container weight.

It is pointed out that bulk products may be conveniently carried in the compartments 61.

*Weights and dimensions pertaining to the carrying of perishable fresh food as well as a form of frozen liquids and the like for economical and efficient handling and consumer use, showing the relation they bear in cubicle content to that of one of the product containers herein mentioned.*

Figures 23, 24, 25, 27:
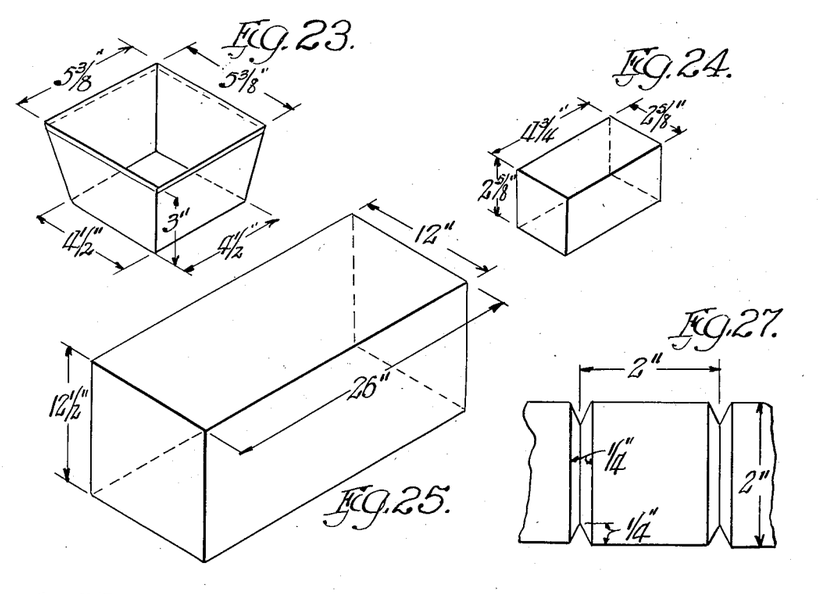
Fig. 23 is a diagrammatic perspective view, with dimensions, of a standard berry box which packs conveniently in the product compartment of the improved container body.
Fig. 24 is a diagrammatic perspective view, with dimensions of a standard size creamery butter print which packs conveniently in the product compartment of the improved container body.
Fig. 25 is a diagrammatic perspective view, with outside dimensions, of a wood packing crate at present used for the transportation and distribution of various kinds of citrus fruits and which will be more fully mentioned later.
Fig. 27 is a view in side elevation of a fragment of the bar appearing in Fig. 26, better illustrating grooves and dimensions thereof that are formed in the bar or stick of Fig. 26, to divide the same into uniform portions.

In Fig. 23 there is schematically illustrated in isometric perspective, with dimensions, a standard berry box and wherein the box is 5⅜" square at the open top, 4½" square at its closed bottom and 3" high. Boxes of this kind may be packed in a compartment 61 by forming a stack three boxes wide by sixteen boxes long and twelve boxes high. Thus 576 of such boxes may be packed in a compartment 61 and should all of compartments be packed, the total for the entire container body would be 3456 boxes with a product weight of about 5184 lbs.

In Fig. 24 there is schematically illustrated in isometric perspective, with dimensions thereon, a standard size creamery butter print. It is 4¾" long, 2⅝" high and 2⅝" wide or thick and weighs one pound and contains 32.7 cubic inches. Butter prints of this kind may be packed in a compartment 61 by forming a stack six prints wide by eighteen prints long and fifteen prints high and totalling 1620 prints and weighing the same number of pounds.

In Fig. 25 there is schematically illustrated in isometric perspective, with outside dimensions, a wooden packing crate at present used for the transportation of various kinds of citrus fruits. Such a crate is 26" long, 12" wide and 12½" high, and has a net volume of 3800 cubic inches. Each 8 lbs. of citrus fruit packed as at present in a crate of this kind requires one lb. of crate. Each body 10, with its six compartments 61, is capable of carrying 67209 lbs., which is equivalent of 93 crates but eliminates 840 lbs. of the material of which the crates are made.

Figures 26, 28:
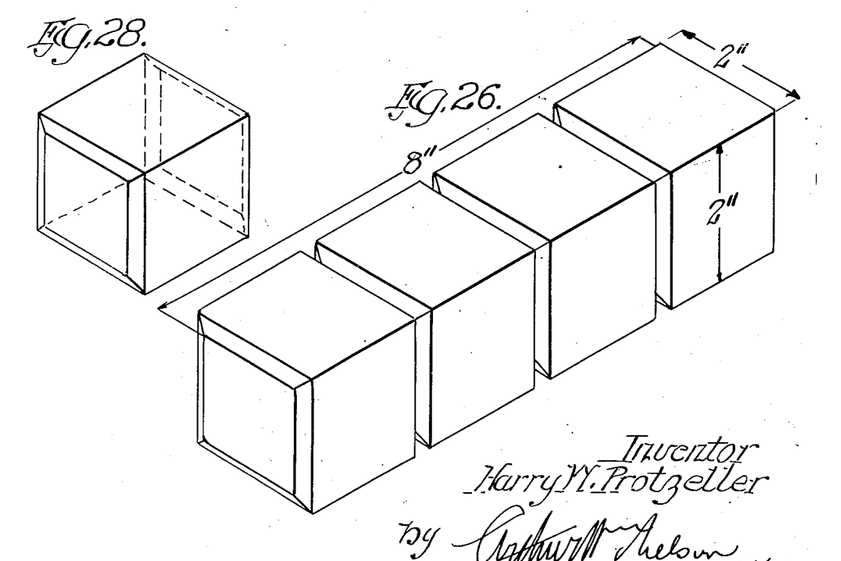
Fig. 26 is an isometric perspective view, with dimensions, showing the manner in which liquid and semi-liquids, such as fruit or vegetable juices, fresh sweet cream or whole milk, shelled eggs, butter, oysters and other edible products may be transported by apparatus after freezing into a bar or stick formed for easy separation into individual cube-like portions for consumption or use.
Fig. 28 is an isometric perspective view of one of the cube-like portions into which the bar or stick of Figs. 26 and 27 may be conveniently separated for consumption or use.

In Figs. 26, 27 and 28 there is illustrated a novel form of food product which may be readily and economically handled by the apparatus, with a considerable savings in cartons, containers, glass jars and the like, as well as providing a quick and easy uniform serving in the home of the ultimate purchaser and consumer. This constitutes the subject matter of a separate application, is not claimed herein, but is shown to illustrate packing capabilities with respect to a compartment 61.

For instance, liquids, semi-liquids, such as fruit or vegetable juices; fresh, sweet cream; whole milk; butter; eggs; oysters and many other items for human consumption, may be frozen solid in the form of a bar or stick that is 8″ long by 2″ high and 2″ wide. At every 2″ of the bar is provided a V-shaped groove ¼″ wide and ¼″ deep which provide lines of weakening, whereby the bar or stick may be broken or severed into individual cubes (see Fig. 28) containing substantially 7.78 cubic inches which is equivalent to ¼ pint or from 4 to 4½ oz.

Products in bar or stick form, as above mentioned, may be separated into individual cubes by striking one of the divisions a sharp blow. Such bars or sticks may be wrapped in "cellophane" or other thin protective material. They stack well in a compartment 61 by arranging them 2 bars wide by 43 long and 20 high and in this manner 1720 of such bars may be stacked in each compartment. This is equivalent to 10,320 lbs. for a container body.

From the foregoing it will be clear that the invention constitutes a new development for the transportation, refrigeration and distribution of perishable foods, either in fresh or frozen form. It makes possible, if desired, direct movement from producer to consumer without the breaking of bulk even though the container be transported by one or more types of carrier service such as highway trucks, railroads, or aircraft.

The invention provides much greater economy and efficiency in the marketing of perishable food products.

If desired the refrigerating unit may be removed and an insulating cover affixed in place at the end of the container, so that the total weight of the container will be substantially reduced. Because of the good insulated construction of the container, a sufficiently low temperature could be retained which would permit movement by aircraft for several hours. On landing and before transfer to ground transport, the end cover member can readily be removed and a refrigerating unit quickly applied so that refrigerated action can again be provided.

For use in transporting so-called quick frozen foods, ample refrigeration is available for long periods of time. It is not necessary to stop the transport means for icing or the addition of other cooling medium.

Because of the weatherproof construction of the containers they may be loaded upon ordinary railroad flat cars, or open platform trucks. Hence, special railroad or automotive equipment is not necessary for use in transporting products requiring refrigeration.

While there is little danger of the mechanical equipment failing to function while the container is en route, should there be a failure of a particular unit, the refrigerating unit being at one end of the container may be readily inspected at any point along the way and if inoperative may either be repaired or a new unit quickly installed.

It is not necessary for shippers to wait for a full carload of any particular product. Because each compartment of the container is sealed against the atmosphere, and against communication with other compartments, different kinds of products may be placed in the various compartments without danger of contamination or the transmission of odors from one to the other.

Because of the same air-tight construction, danger of dehydration during long journeys is avoided even though the product be not wrapped or packaged in air-tight packages.

Products frozen in bulk can be placed directly in the compartments of the container, if desired. Also, whether the product be bulk or packaged, it may be placed directly in the compartments and the compartments sealed before leaving the freezing plant or other processing plant. This greatly facilitates the loading operation and prevents the great losses by heat transfer which occur under present practice where the products are packed in refrigerator cars standing on the siding, or in highway trucks on the roadway.

Hence the invention provides benefits that will accrue to producers, processors, distributors, retailers and consumers.

Variations and modifications within the spirit of the invention will, no doubt, suggest themselves to those skilled in the art. Hence the scope of the invention should be determined from the claims and not necessarily be limited to the exemplary details described.

I claim as my invention:

1. A portable refrigerator container embodying rectangularly disposed upright walls forming a hollow product receiving space for the product to be refrigerated, a plurality of upright hollow walls extending between two of said spaced upright walls and dividing the product space into a plurality of compartments, a refrigerating unit for chilling air, said unit being disposed externally of said rectangularly disposed upright walls and being carried by said container so as to be transportable as a unit therewith, said refrigerating unit including means for recirculating the chilled air through a path including the space between the walls defining said upright hollow walls and a heat extracting portion of the refrigerating unit.

2. A transportation container unit embodying therein a horizontal bottom wall, vertical side walls, vertical end walls, all said walls being composed of heat insulating material, and all connected to form an open-top hollow chamber, a plurality of transversely disposed vertically positioned longitudinally spaced hollow partitions dividing the chamber into a plurality of open-top compartments, each said hollow partition having a plurality of openings in the bottom thereof communicating the interior of the hollow partitions with a space therebelow, said hollow partitions having openings in the upper parts at the ends thereof communicating with spaces outwardly thereof, and means forming channels whereby refrigerated air may be conducted from a point of entrance through one vertical insulated wall, longitudinally along the bottom of the container upwardly through the several hollow partitions, laterally outwardly therefrom to a separate point of discharge through an insulated wall at the same end of the container.

3. A transportation container unit embodying therein a horizontal bottom wall, vertical side walls, vertical end walls, all said walls being composed of heat insulating material, and all connected to form an open-top hollow chamber, a plurality of transversely disposed vertically positioned longitudinally spaced hollow partitions dividing the chamber into a plurality of open-top compartments, each said hollow partition having a plurality of openings in the bottom thereof communicating the interior of the hollow partitions with a space therebelow, said hollow partitions having openings in the upper parts at the ends thereof communicating with spaces outwardly thereof, and means forming channels whereby refrigerated air may be conducted in a path from a point of entrance through on insulated wall, longitudinally along the bottom of the container upwardly through the several hollow partitions, laterally outwardly therefrom and to a separate point of discharge through an insulated wall.

4. A transportation container unit embodying therein a horizontal bottom wall, vertical side walls, vertical end walls, all said walls being composed of heat insulating material, and all connected to form an open-top hollow chamber, a plurality of transversely disposed vertically positioned longitudinally spaced hollow partitions dividing the chamber into a plurality of open-top compartments, each said hollow partition having a plurality of openings in the bottom thereof communicating the interior of the hollow partitions with the space therebelow, said hollow partitions having openings in the upper parts at the ends thereof communicating with spaces outwardly thereof, means for circulating refrigerated air, and means for conducting said circulated refrigerated air in a path from a point of entrance through one insulated wall, longitudinally along the bottom of the container upwardly through the several hollow partitions, laterally outwardly therefrom and to a separate point of discharge through an insulated wall of the container.

5. A transportation container unit embodying therein a horizontal bottom wall, vertical side walls, vertical end walls, all said walls being composed of heat insulating material, and all connected to form an open-top hollow chamber, a sheet metal casing having bottom, side and end walls forming an open top chamber, said sheet metal casing being of smaller size than the chamber formed by said heat insulated walls, and being positioned in said first mentioned chamber so that the bottom, side and end walls of the sheet metal casing are spaced from the adjacent interior surfaces of the said insulated walls, a plurality of transversely disposed vertically positioned longitudinally spaced hollow partitions dividing the sheet metal casing chamber into a plurality of open-top compartments, each said hollow partition having a plurality of openings in the bottom thereof communicating the interior of the hollow partitions with the space between the bottom insulated wall of the container unit and the bottom of the metallic casing, and each said hollow partition having an opening in the upper part of each end thereof communicating with aligned openings in the side walls of the metal casing, which open into the spaces between the side walls of the metal casing and the insulated side walls, and means forming paths for conducting air from a point of entrance in one vertical insulated wall, longitudinally along the bottom of the metallic chamber upwardly through the several hollow partitions, laterally into the spaces between the insulated side walls and the metallic casing and back to a point of discharge through one of the insulated walls at that end of the container where the air entered.

HARRY W. PROTZELLER.

REFERENCES CITED

The following references are of record in the file of this patent:

UNITED STATES PATENTS

| Number | Name | Date |
|---|---|---|
| 1,349,369 | Dahlke | Aug. 10, 1920 |
| 1,752,276 | Martin | Mar. 25, 1930 |
| 1,812,102 | Lundgaard | June 30, 1931 |
| 1,814,915 | Grayson | July 14, 1931 |
| 1,917,873 | Campbell | July 11, 1933 |
| 1,926,700 | Owens | Sept. 12, 1933 |
| 1,984,135 | Houston | Dec. 11, 1934 |
| 2,047,462 | Doyle | July 14, 1936 |
| 2,047,954 | Fitch | July 21, 1936 |
| 2,053,206 | Sargent | Sept. 1, 1936 |
| 2,058,871 | Heath | Oct. 27, 1936 |
| 2,066,124 | Rinker | Dec. 29, 1936 |
| 2,073,981 | Woodruff | Mar. 16, 1937 |
| 2,128,364 | Kellett | Aug. 30, 1938 |
| 2,138,886 | Schramm | Dec. 6, 1938 |
| 2,150,699 | Philipp | Mar. 14, 1939 |
| 2,180,915 | Stebbins | Nov. 29, 1939 |
| 2,244,892 | Newton | June 10, 1941 |
| 2,285,075 | Ashley | June 2, 1942 |
| 2,303,857 | Numero | Dec. 1, 1942 |
| 2,325,568 | Eaton | July 27, 1943 |
| 2,336,687 | Johnston | Dec. 14, 1943 |
| 2,346,837 | Grooms | Apr. 18, 1944 |
| 2,375,688 | Quatman | May 8, 1945 |

FOREIGN PATENTS

| Number | Country | Date |
|---|---|---|
| 445,349 | Great Britain | Apr. 3, 1936 |